(12) United States Patent
Nojima

(10) Patent No.: US 6,272,458 B1
(45) Date of Patent: Aug. 7, 2001

(54) METHOD AND APPARATUS FOR ANALYZING A LANGUAGE EXPRESSION ELEMENTS OF CARTOON FRAMES AND CALCULATING POINTS OF ANALYZED ELEMENTS

(76) Inventor: Seiji Nojima, 2705, Aza-Shiobata, Oaza-Shiobata, Saori-cho, Ama-gun Aichi 496 (JP)

( * ) Notice: Subject to any disclaimer, the term of this patent is extended or adjusted under 35 U.S.C. 154(b) by 0 days.

(21) Appl. No.: 09/341,758
(22) PCT Filed: Apr. 25, 1997
(86) PCT No.: PCT/JP97/01458
 § 371 Date: Jul. 16, 1999
 § 102(e) Date: Jul. 16, 1999
(87) PCT Pub. No.: WO98/48697
 PCT Pub. Date: Nov. 5, 1998

(51) Int. Cl.[7] .............................. G06F 17/28; G06F 17/40; G06F 17/60
(52) U.S. Cl. ................................ 704/10; 704/1; 707/532; 434/428
(58) Field of Search ..................... 704/1, 9, 10; 707/530, 707/531, 532, 533; 434/156, 167, 169, 178, 365, 428, 322, 236

(56) References Cited

U.S. PATENT DOCUMENTS

| | | | |
|---|---|---|---|
| 4,773,009 | * 9/1988 | Kucera, et al. | 707/531 |
| 5,697,789 | * 12/1997 | Sameth, et al. | 434/157 |
| 5,882,202 | * 3/1999 | Sameth, et al. | 434/157 |
| 6,016,467 | * 1/2000 | Newsted, et al. | 704/9 |

FOREIGN PATENT DOCUMENTS

JP40-9122106A * 5/1997 (JP).
jp41-1155846A * 6/1999 (JP).

OTHER PUBLICATIONS

The Japanese Journal of Ergonomics, vol. 26, special issue (Tokyo) (Jun. 01, 1990), Satoru Furutani, Shin Nojima, Seiji Nojima "Study on the words appearing in the sentences written by the mentally ill and the normal (in Japanese)" pp. 302, 303.

The Japanese Journal of Ergonomics, vol. 26, special issue (Tokyo) (Jan. 06, 1990), Shuichi Yamamoto, Shin Nojima, Seiji Nojima "Study on the descrimination between the sentences written by the normal and those written by the mentally ill (in Japanese)" pp. 304, 305.

* cited by examiner

Primary Examiner—Joseph Thomas
(74) Attorney, Agent, or Firm—Sughrue, Mion, Zinn, Macpeak & Seas, PLLC

(57) ABSTRACT

A method of analyzing data generated by the response of a subject person to certain stimuli in the nature of cartoon images, to an extent sufficient to judge quickly the common meaning of the data in an objective manner. According to the method, data is generated and collated by presenting a cartoon comprising several frames constituting a story to a subject person and collecting several kinds of dictionary data that result from the response of the subject person to the cartoons. The coincidence of each dictionary data is judged. Finally, points of respective analyzed elements correspond to or not corresponding to each dictionary data is calculated, and the data is analyzed.

4 Claims, 2 Drawing Sheets

METHOD AND APPARATUS FOR ANALYZING A LANGUAGE EXPRESSION ELEMENTS OF CARTOON FRAMES AND CALCULATING POINTS OF ANALYZED ELEMENTS

TECHNICAL FIELD

The present invention relates to a method and apparatus for analyzing a language expression function to be applied, where a person in charge of personnel affairs evaluates character of an office employee, and a doctor and a psychologist judge schizophrenia, as an assistance in judging the mental health and capability for recognition and understanding of a subject.

BACKGROUND ART

Conventionally, where a person in charge of personnel affairs evaluates character of an office employee, and a doctor and a psychologist judge schizophrenia, the procedure has been taken in which for example, a picture, a photograph or the like is presented to a subject to extract responses according to language, feeling and action of a subject. The responses of the subject person are synthesized and examined so that a person in charge of personnel affairs can evaluate the character of an office employee, and a doctor and a psychologist can judge the mental health and capability for recognition and understanding of a subject.on the basis of their experiential knowledge.

To put it concretely, the procedure has been taken in which a picture, a photograph or the like representative of a certain scene is presented to a subject to have him or her explain circumstances of the scene, or a plurality of pictures, photographs or the like are presented to have a subject arrange them in an order constituting a certain story to extract responses according to language, feeling and action of the subject, thus judging his or her mental health and capability for recognition and understanding.

In the conventional method as described, however, non-concrete things are presented to a subject for his or her free association therebetween, which therefore standardizes comprehensive reaction to enable standardizing the individual characters, However it has been difficult to judge the common sense. Further, the conventional method greatly depends on the objectivity of a person in charge of personnel affairs, a doctor, a psychologist and so on, thus making a judgement of high subjectivity. Moreover, what can be expected are only the responses according to simple language, feeling and action, failing to perform clear and quick judgements.

DISCLOSURE OF THE INVENTION

The present invention has been accomplished in view of the problem as noted above with respect to the prior art. An object of the invention is to provide a method and apparatus for analyzing a language expression function in which concrete things are presented to a subject to have him or her understand, on the basis of a story in terms of social contract, and commonsense thinking, recognition or the like on the basis of the social contract are extracted objectively to the utmost from a subject's language and expression. On the basis of a subject person's language and expression, a professional analyst can to prepare analyzed data enough to judge the common sense and mental health and capability for recognition and understanding whereby the judgement which is high in objectivity, and clear and quick can be made.

For achieving the aforementioned object, the present invention provides a method for analyzing a language expression function, comprising: collating collected data obtained by presenting a cartoon comprising several frames constituting a story to a subject with several kinds of dictionary data constituted by dividing language data obtained by presenting said cartoon, judging a coincidence with each dictionary data, calculating points of respective analyzed elements corresponding to or not corresponding to the each dictionary data, and preparing analyzed data.

According to the method for analyzing a language expression function of the present invention, a cartoon comprising several frames constituting a story is presented to a subject to have him or her resolve with a language expression. From the expression, it is possible to extract the commonsense thinking, process of recognition and the like on the basis of the social contract of a subject, to obtain a fixed response on the basis of social contract meaning and contents, and to acquire enough analyzed data, in grater quality and quantity that can be obtained by the conventional method.

Further, the analyzed data obtained by judging the coincidence between the collected data and the dictionary data are used whereby the actual collating ability, meaning-grasping ability and language expression ability of a subject can be grasped objectively. Moreover, the judgment can be obtained with high objectivity, with the subjectivity of a person in charge of personnel affairs, a doctor and a psychologist eliminated to the utmost.

According to the present invention, there is further provided an apparatus for analyzing a language expression function, comprising: an input unit for inputting collected data obtained by presenting a cartoon comprising several frames constituting a story to a subject; a memory system comprising a collected data memory section for storing collected data, a dictionary data memory section for storing several kinds of dictionary data constituted by dividing language data obtained by presenting said cartoon according to the frequency of appearance, and an analyzed data memory section for storing analyzed data subjected to operation processing; a central processing unit for collating collected data with several kinds of dictionary data to judge a coincidence with each dictionary data, calculating points of respective analyzed elements corresponding to or not corresponding to the each dictionary data, and preparing analyzed data; and an output unit for outputting the analyzed data.

According to the apparatus for analyzing a language expression function, the method for analyzing a language expression function of the present invention can be carried out clearly and quickly.

BEST MODE FOR CARRYING OUT THE INVENTION

Figure 1:
FIG. 1 shows one example of views representative of a cartoon used when a method for analyzing a language expression function according to the present invention is carried out.
Figure 2:
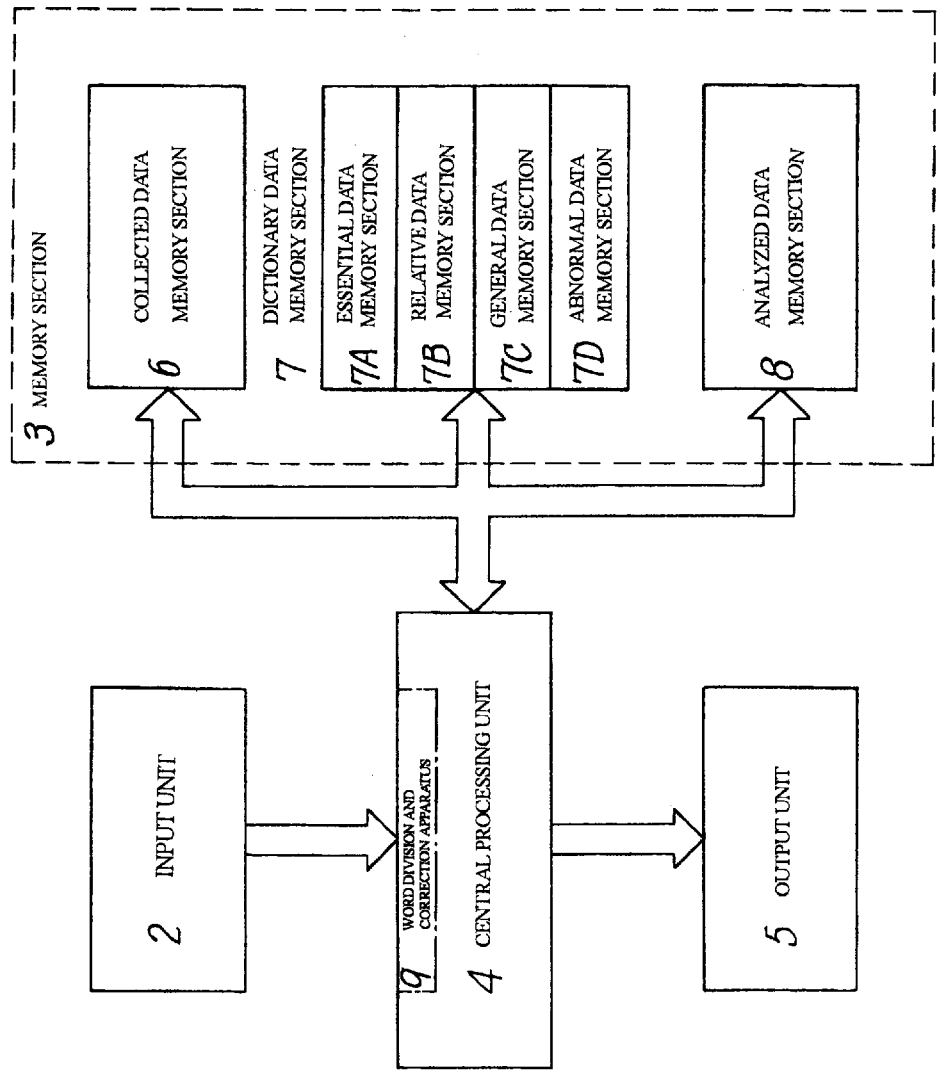
FIG. 2 is a schematic view showing the constitution of an apparatus for analyzing a language expression function according to the present invention.

The method for analyzing a language expression function according to the present invention is carried out using a cartoon as shown in FIG. 1 and the apparatus for analyzing a language expression function 1 as shown in FIG. 2.

The cartoon provides a story comprising four to six frames by selecting two by two out of twelve (12) fundamental feelings, i.e., surprise, anger, sorrow, joy, uneasiness, reliance, fear, peace of mind, shame, contempt, aversion, and guilt.

The cartoon shown in FIG. 1 selects two feelings, i.e., surprise and anger, to constitute a story in which (A) A man who sees a woman whose appearance of her back is good (B) (comes near) her to call out (in an attempt to tempt her for tea), and found that (C) her face (turned round) was (terribly) ugly, so (D) he was surprised (and stared his eyes out), then (E) she gets angry with him and (brandishes) her hand-bag to strike him in the face. (F) When she (was insulted) and gets angry and left, he (has a bump come out in the face) and also gets angry.

Similarly, two by two out of the remaining fundamental feelings are selected to create a cartoon comprising six stories in total.

The cartoon constituting a story including the expression of the fundamental feelings as described above is used to allow a subject to understand the object of language expression provided in terms of social contract and to make the language expression toward the fixed object as provided, whereby it is possible to objectively allow expression of the directivity of syntagme (copula) and the directivity of paradigme (dispersion) in the language expression.

In order to extract as objectively as possible the common-sense thinking, recognition or the like based on the social contract of the subject, it is more preferable that a cartoon not including language is used.

The apparatus for analyzing a language expression function 1 comprises an input unit 2, a memory system 3, a central processing unit 4, and an output unit 5, as shown in FIG. 2.

The input unit 2 is a device for inputting collected data obtained from a subject, a key-board, a card reader and so on being applied.

In the case where a subject is a person who can generate an adequate voice, a voice recognition device can be also used as the input unit 2.

The memory system 3 comprises a collected data memory section 6, a dictionary data memory section 7, and an analyzed data memory section 8.

The collected data memory section 6 is a section for temporarily storing collected data, and the analyzed data memory section 8 is a section for temporarily storing analyzed data subjected to operation processing.

The dictionary data memory section 7 is a section for storing several kinds of dictionary data in which language data obtained by presenting the aforementioned cartoon are divided according to frequency of appearance, and further comprises an essential data memory section 7A, a relative data memory section 7B, a general data memory section 7C, and an abnormal data memory section 7D.

The essential data is language data, in the case where the aforementioned cartoon is presented and the contents thereof are explained, which appears without fail if a subject is normal, the frequency of appearance being approximately 100%.

For example, in the cartoon shown in FIG. 1, the language data include (A): woman, see, man, (B): her, call out, (C): her, face, ugly, (D): he, surprised, (E): she, gets angry, him, strike, she, left, he, gets angry, etc.

The relative data is language data, in the case where the aforementioned cartoon is presented and the contents thereof are explained, which approximately appears if a subject is normal, the frequency of appearance being approximately 70% or more.

For example, in the cartoon shown in FIG. 1, the language data include (A): appearance of her back, good, tea, tempt, (B): comes near, (C): turned round, terribly, (D): eyes, stared, (E): hand-bag, brandishes, face, (F): insulted, gets angry, face, bump, come out, etc.

The general data is language data, in the case where the aforementioned cartoon is presented and the contents thereof are explained, which rarely appears if a subject is normal, the general data being normally generally used as the language data in itself.

For example, those in which the essential data and the relative data are excluded from the language data as described in a (Japanese) language dictionary.

The abnormal data is language data, in the case where the aforementioned cartoon is presented and the contents thereof are explained, which appears from a subject who is abnormal in terms of recognition and understanding, and which rarely appears if a subject is normal.

For example, those which appear from an error in recognition, interpretation in wild fancies, abnormal language, etc., which can be judged to be morbid merely by appearance of the language data.

The central processing unit 4 carries out the operation processing for sequentially removing the collected data from the collected data memory section 6 and the dictionary data from the dictionary data memory section 7, collating the collected data with each dictionary data to judge a coincidence with each dictionary data, calculating the points of each analyzed element corresponding to or not corresponding to each dictionary data to prepare analyzed data, and operation processing such as temporarily storing the analyzed data in the analyzed data memory section 8.

The output unit 5 is a device for outputting the analyzed data subjected to operation processing, a display, a printer or the like being applied.

In the case where language data obtained from a subject are divided in advance every clause or word, words being conjugated are modified into the original form, and these are input by the input unit 2 as collected data, the aforementioned constitution will suffice.

However, in the case where language data obtained from a subject are input as the collected data by the input unit 2, it is necessary to provide, on the central processing unit 4, a word division and correction apparatus 9 which divides the language data every clause or word, and modifies words being conjugated into the original form to provide collected data.

Next, in the method for analyzing a language expression function, the procedure for (i) dividing language data obtained from a subject in advance every clause or word, (ii) modifying words being conjugated modified into the original form, and (iii) inputting these by the input unit as collected data will be explained in that order.

The essential data, the relative data, the general data, and the abnormal data are sequentially input in advance every frame of the cartoon by the input unit 2, and stored in the essential data memory section 7A, the relative data memory section 7B, the general data memory section 7C, and the abnormal data memory section 7D in the dictionary data memory section 7 of the memory system 3.

First, the cartoon shown in FIG. 1 is presented to a subject for explanation of contents thereof, and an examiner writes or records the explanation every frame of the cartoon. Subsequently, the language data obtained from a subject are divided every clause or word, and words being conjugated are modified into the original form to provide collected data.

The thus obtained collected data are sequentially input every frame into the input unit 2, and stored in the collected data memory section 6 of the memory system 3. If the collected data is the first collected data in the (A) frame, it is stored with a coordinate (A, 1) applied thereto.

When the central processing unit 4 is operated, the collected data are sequentially taken out every frame from the collected data memory section 6, and the essential data, the relative data, the general data, and the abnormal data are then sequentially taken out every frame from the dictionary data memory section 7 for judgement if there are some which are in coincidence.

In the case where there is one, out of the collected data, which coincides with the essential data, the relative data, the general data, and the abnormal data, points by the number of coincided data are recorded as the essential element, the relative element, the general element and the abnormal element, respectively.

If there is no one which coincides with any data, points by the number of data are recorded as indefinite elements.

Suppose, when the cartoon shown in FIG. 1 is presented to a subject for explanation of contents thereof, the subject explained a story in which (A) A man who saw a woman who has a lovely style thinks to tempt her for tea, (B) called out to her and (C) found that her face was "gyao" (frightful), and so (D) he was surprised and his eyes are starting out, said that there is something black here. It is funny with one eye. There is a hole here, and telepathy is present through the hole. (E) She gets "bufu" (displeased) and kicked at him by belt. (F) She gets "bufu" and has gone, but he also had a bump come out and gets angry.

In this case, the collected data include (A): style, lovely, woman, saw, man, tea, tempt, (B): her, called out, (C): her, face, "gyao", (D): he, surprised, eyes, starting out, here, black, thing, there is, one eye, funny, here, hole, hole, through, telepathy, present, (E): she, "bufu", belt, him, kicked, (F): she, "bufu", gone, he, bump, come out, angry.

Out of the collected data, those which coincide with the essential data are (A): woman, saw, man, (B): her, called, out, (C): her, face, (D): he, surprised, (E): she, him, (F): she, gone, he, angry, and 16 points are recorded as essential elements.

Those which coincide with the relative data are (A): style, lovely, tea, tempt, (B)-(C)-(D): eyes, starting out, (E)-(F): bump, come out, and 8 points are recorded as relative elements.

Those which coincide with the general data are (A)-(B)-(C)-(D): here, black, thing, there is, one eye, funny, (E): belt, kicked, (F):-, and 8 points are recorded as abnormal elements.

Those which do not coincide with any data are (A)-(B)-(C): "gyao", (D)-(E): "bufu", (F):"bufu", and 3 points are recorded as indefine elements.

Similarly, a cartoon constituting other five stories is presented to a subject for explanation of contents thereof to thereby obtain collected data, which are input into the apparatus for analyzing a language expression function, and a coincidence with the essential data, the relative data, the general data, and the abnormal data is judged to obtain analyzed data comprising the number of point of the essential element, the relative element, the general element, the abnormal element and the indefinite element.

It is possible to judge the health of a subject's recognition and understanding on the basis of the analyzed data as follows:

The essential data makes no sense unless it is used in the explanation of contents of the cartoon, and is language data which appears without fail if a person is normal. Therefore, lacking in the number of points of the essential elements can be judged that a degree of "defect" in the language expression is high.

The abnormal data can be judged to be abnormal merely by the appearance of the language data, and is language data which appears from a subject which is abnormal in recognition and understanding. Therefore, an increase in the number of point of the abnormal elements can be judged that a degree of "defect" in the language expression is high.

On the other hand, the general data is less in frequency of use even a normal person in the explanation of contents of the cartoon. Since those which do not coincide with any data are language data peculiar to a subject, those pointed as the general element and the indefinite element are individually judged by an examiner.

There are classified, for example, into (1) those in which if they are present, expression is made accurate and rich, (2) those which are scarce but not erroneous, (3) those in which since an individual and creative story is added, they are separated from a standard story but are classified into one which finally arrives at a standard story to judge the health of recognition and understanding of a subject.

As described above, by using the analyzed data, it is possible to perform, in judging the health of recognition and understanding of a subject, judgement of high objectivity from which subjectivity of a person in charge of personnel affairs, a doctor, a psychologist and so on is eliminated to the utmost.

What is claimed is:

1. A method for analyzing a language expression function, comprising:

presenting a cartoon comprising several frames constituting a story to a subject person and collecting a response of such person as language data representing said subject person's interpretation of said cartoon, collating said collected data with several kinds of dictionary data constituted by dividing language data obtained by presenting said cartoon, calculating points of respective analyzed elements as corresponding to or not corresponding to the each dictionary data, and preparing analyzed data.

2. An apparatus for analyzing language expression function, comprising:

an input unit for inputting collected language data obtained by presenting a cartoon comprising several frames constituting a story to a subject, said language data representing said subject person's interpretation of said cartoon;

a memory system comprising a collected data memory section for storing collected data, a dictionary data memory section for storing several kinds of dictionary data constituted by dividing language data obtained by presenting said cartoon according to the frequency of appearance, and an analyzed data memory section for storing analyzed data subjected to operation processing;

a central processing unit for collating collected data from said collected data memory section with several kinds of dictionary data from said dictionary data memory section and for judging a coincidence of said collected data with each dictionary data, said central processing unit also being for calculating points of respective analyzed elements corresponding to or not corresponding to the each dictionary data, and preparing analyzed data; and an output unit for outputting the analyzed data.

3. The method of claim 1 wherein said cartoon has no text.

4. The apparatus of claim 2 wherein said cartoon has no text.

* * * * *